(12) United States Patent
Donaires

(10) Patent No.: US 7,062,580 B2
(45) Date of Patent: Jun. 13, 2006

(54) LOGIC ARRANGEMENT, SYSTEM AND METHOD FOR CONFIGURATION AND CONTROL IN FIELDBUS APPLICATIONS

(75) Inventor: Omar Donaires, Ribeirao Preto (BR)

(73) Assignee: Smar Research Corporation, Holbrook, NY (US)

( * ) Notice: Subject to any disclaimer, the term of this patent is extended or adjusted under 35 U.S.C. 154(b) by 310 days.

(21) Appl. No.: 10/436,763

(22) Filed: May 13, 2003

(65) Prior Publication Data
US 2004/0059851 A1 Mar. 25, 2004

Related U.S. Application Data

(60) Provisional application No. 60/412,236, filed on Sep. 20, 2002.

(51) Int. Cl.
*G06F 13/00* (2006.01)
(52) U.S. Cl. ............. 710/104; 710/62; 703/15; 370/254
(58) Field of Classification Search ........... 710/104, 710/62; 700/86, 83, 17, 33; 715/789, 813; 709/228, 223, 253, 302; 703/15; 370/254, 370/257; 702/122
See application file for complete search history.

(56) References Cited

U.S. PATENT DOCUMENTS

| | | | |
|---|---|---|---|
| 5,841,654 A | 11/1998 | Verissimo et al. | |
| 5,909,368 A | 6/1999 | Nixon et al. | |
| 5,940,294 A | 8/1999 | Dove | |
| 5,971,581 A * | 10/1999 | Gretta et al. | 700/83 |
| 5,978,850 A | 11/1999 | Ramachandran et al. | |
| 6,076,952 A * | 6/2000 | Gretta et al. | 700/83 |
| 6,095,674 A | 8/2000 | Verissimo et al. | |
| 6,141,596 A | 10/2000 | Gretta et al. | |
| 6,195,591 B1 | 2/2001 | Nixon et al. | |
| 6,411,858 B1 | 6/2002 | Sakurai et al. | |
| 6,931,288 B1 * | 8/2005 | Lee et al. | 700/86 |
| 6,941,261 B1 * | 9/2005 | Quinn | 703/27 |
| 2002/0013629 A1 | 1/2002 | Nixon et al. | |

OTHER PUBLICATIONS

"An efficient information server for advanced plant asset management" by Muller et al. (abstract only)☐☐Publication Date: Sep. 16-19 2003.*

* cited by examiner

*Primary Examiner*—Gopal C. Ray
(74) *Attorney, Agent, or Firm*—Dorsey & Whitney LLP

(57) ABSTRACT

The present invention relates generally to a logic arrangement, system and method which aid in a design of a fieldbus network configuration. In particular, the present invention includes certain functions for an automatic generation and verification of block and device tags, function block verification and modifications for function block type consistency based on information in the block profile, automatic allocation of function blocks into devices by an off-line scheduler, and a control strategy configuration system (which uses artificial intelligence to generate and maintain a fieldbus design knowledge-base). Accordingly, the user is able to easily configure the fieldbus network and devices residing thereon in an effective manner, as well as use the previously used configurations for establishing new fieldbus networks.

9 Claims, 17 Drawing Sheets

LOGIC ARRANGEMENT, SYSTEM AND METHOD FOR CONFIGURATION AND CONTROL IN FIELDBUS APPLICATIONS

CROSS-REFERENCE TO RELATED APPLICATION

This application claims priority from U.S. application Ser. No. 60/412,236, filed Sep. 20, 2002, the entire disclosure of which is incorporated herein by reference.

FIELD OF THE INVENTION

The present invention relates generally to a logic arrangement, system and method which aids in configuring and controlling components on a fieldbus network. In particular, the present invention provides capabilities for automatic generation and verification of function block tags, device tags, and function block type consistency based on information in the block profile. The present invention also allows for an automatic allocation of the function blocks for the field devices by an off-line scheduler, and provides a control strategy configuration system and process which uses artificial intelligence techniques and/or arrangements to generate and maintain a fieldbus design knowledge-base.

BACKGROUND OF THE INVENTION

Process control systems and methods provide a way for improving efficiency, reliability, profitability, quality and safety in a process/product manufacturing environment. Such process control systems and methods can be used for automation, monitoring and control of devices and applications in a wide array of industrial applications for many industry segments, such as textiles, glass, pulp and paper, mining, building, power, sugar, food and beverage, oil and gas, steel, water and wastewater, chemicals, etc.

Conventional process control systems and methods generally operate with a plurality of field devices positioned at various locations on, e.g., a 4–20 mA analog network. These field devices include measurement and control devices (such as temperature sensors, pressure sensors, flow rate sensors, control valves, switches, etc., or combinations thereof). Recently, a number of protocols have been introduced which provide a digital alternative to conventional control systems and methods, and which utilize "smart" field devices. These "smart" field devices can provide the same functionality as the conventional devices listed above, and may additionally include one or more microprocessors, one or more memories, and/or other components incorporated therein. Such smart field devices can be communicatively coupled to each other and/or to a central processor using an open smart communications protocol. Such protocol (e.g. Foundation® Fieldbus protocol) has been widely used in manufacturing and process plants. A number of such protocols have been developed for non-process control environments, such as automobile manufacturing or building automation, and then later adapted to be used for process control. Some of the more widely used fieldbus protocols include Hart®, Profibus®, Foundation® Fieldbus, Controller Area Network protocols, etc.

Fieldbus process control systems and methods may also utilize a controller that is communicatively coupled to each of the smart field devices using an open "smart" communications protocol, and a server communicatively coupled to the controller using, for example, an Ethernet connection. Moreover, this controller may include a processor, and can receive data from each of the "smart" field devices. Such "smart" field devices each preferably include a processor for performing certain functions thereon, without the need to use the central host for performing such functions. The amount of processing to be executed by the centralized host generally depends on the type of the control application and the protocol used.

A smart fieldbus device, as configured by a software configuration tool, may be programmed to execute function blocks. A function block can provide fundamental automation functions that are performed by the process control application. In essence, the function blocks are software models which can define the behavior of the process control system. More particularly, the function block may be a software logic unit which processes input parameters according to a specified algorithm technique and an internal set of control parameters, and generates resulting output parameters that are available for use within the same function block application and/or by other function block applications. The input parameters of one function block may be linked to the output parameters of one or more other function blocks on the fieldbus network. The execution of each function block can be scheduled. After the function block is executed using the corresponding input values, its outputs are updated and then published on the network, where they can be subscribed by inputs of other function blocks using this information. These linked function blocks may reside either inside the same field device or in different devices on the network.

Three different types of function blocks are generally used in the fieldbus applications, e.g., Resource Blocks, Function Blocks, and Transducer Blocks. For example, the Resource Blocks define parameters that pertain to the entire application process inside a device (e.g., manufacturing ID, device type, etc.). The Function Blocks encapsulate control functions (e.g., PID controller, analog input, etc.). The Transducer Blocks represent an interface to sensors such as temperature, pressure and flow sensors.

Each function block in the system can be identified by a unique tag which is generally assigned by the user. The parameters of each function block can be represented by object descriptions that define how the parameters are communicated on the fieldbus network. Thus, many parameters in the system are likely uniquely identified by their reference to their block tag and parameter name or, alternatively, by their reference to their block tag and parameter relative index (the ordinal index that represents the offset of the parameter in the whole list of parameters).

Each fieldbus device likely has a Resource Block and at least one Function Block with input and/or output parameters that link to other function blocks, either in the same device or in separate devices by using the fieldbus. Each input/output parameter generally includes a particular value portion and a particular status portion. The status portion of each parameter includes information regarding the reliability of the data contained in the input/output parameter, and instructs the receiving function block as to whether the reliability of contained data is acceptable, uncertain or unacceptable. In addition, a Function Block Application Process ("FBAP") can specify the handling of control modes, alarms, events, trend reports and views. These features comply with the Foundation® specification in order for the device to be considered interoperable at a User Layer.

Distribution of control to the field devices can be performed by synchronizing the execution of the function block, and transmitting the function block parameters on the fieldbus network. Such functions, along with the publication of the "time of day" to the devices, an automatic switch over to a redundant time publisher, an automatic assignment of device addresses, and a search for parameter names or "tags" on the fieldbus can generally be handled by System Management and/or Network Management.

A control strategy may be generated through an interconnection of the various function blocks contained in the field devices. The control strategy may also be modified without any hardware changes, thus providing another level of flexibility. Function blocks and control strategies are further described in the Foundation® Fieldbus and Profibus® fieldbus specifications, both of which are incorporated herein by reference.

The configuration of a fieldbus control strategy, however, can be an extremely complex task. A large application can involve hundreds or even thousands of function blocks. Such a large fieldbus network configuration may have several associated problems. The manual typing of block tags can be extremely repetitive, time consuming and cumbersome. Additionally, the manual entry of block tag names may result in errors. It may also be a waste of resources for a trained technician to spend a significant amount of time entering the tag names.

Further, conventional software configurators are usually complex and unwieldy due to the open nature of known fieldbus network protocols. Such configurators are designed to accommodate devices produced by a number of different vendors which may provide a wide variety of functionality. Many of these configurators (in an effort to simplify their design) generally rely on a scheme in which the configuration is loaded directly from the field devices. However, it may be advantageous to provide for the configuration to be completed and modified off-line as well.

Additionally, because of the high level of complexity of fieldbus control strategies, prior art software configurators may need a highly trained user with substantial fieldbus experience to perform all configuration creation and modification functions.

Currently, there exists no logic arrangement, system and method which can automatically generate function block tags based on the device tag for the device containing the function block. Such logic arrangement, system and method would facilitate a more efficient configuration procedure for a fieldbus network and devices. Additionally, there exists no logic arrangement, system and method which can be configured to maintain the consistency of function block tags in such scheme, whereby the function block may be moved from one device to another, and therefore (due to this deficiency) the tag would therefore need to be manually changed to remain consistent with the tag naming scheme. Furthermore, there exists no logic arrangement, system and method which facilitate off-line scheduling of function blocks and network traffic for a fieldbus network while automatically distributing function blocks to the devices.

SUMMARY OF THE INVENTION

Therefore, a need has arisen to provide a logic arrangement, system and method of the present invention which automatically generates block tags based on either the device tag for the device containing the block or the control strategy tag for the control strategy containing the block. Such a logic arrangement, system and method may facilitate a more efficient configuration procedure for a fieldbus network. Additionally, an exemplary software system used by the logic arrangement, system and method of the present invention can be configured to ensure a consistency of function block tags. In this exemplary scheme for naming or tagging the function block where the function block tag names are based on particular device tags (or particular control strategy tags), the function blocks may be moved from one device to another (or from one control strategy to another), and the tag can be automatically updated by the logic arrangement system and method to maintain consistency with the tag naming scheme. Furthermore, the logic arrangement, system and method of the present invention may facilitate off-line scheduling of the function blocks and network traffic for providing a fieldbus network control strategy configuration. Moreover, the software system used by the logic arrangement, system and method of the present invention may provide an automated assistance for configuring a control strategy for the fieldbus network.

One of the advantages of the logic arrangement, system and method according to the present invention is that it can increase the efficiency with which the user can design a fieldbus application configuration comprising many fieldbus network segments. Further, the configuration and scheduling functions may be performed off-line, without the need for a complete physical fieldbus network installation. Another advantage of the logic arrangement, system and method according to the present invention is that they may allow a less experienced user to configure a fieldbus network due to the fact that many of the tasks can be automated. Additionally, the logic arrangement, system and method of the present invention may provide information to the user so as to guide the user in configuring the fieldbus network.

One exemplary embodiment of the logic arrangement, system, and method for configuring a fieldbus network according to the present invention can obtain particular information relevant to a function block and automatically generating a tag for the function block. According to another exemplary embodiment, it is possible to determine whether a type of a particular function block is supported by a device that is capable of being connected to the fieldbus network, and executes at least one operation based on such determination.

At least one template containing predefined fieldbus configuration data can be obtained, and a configuration for the fieldbus network may be generated based on such template(s). In another exemplary embodiment of the present invention instructional information associated with a configuration of the fieldbus network can be generated based on the template(s).

Furthermore, it is possible to obtain information regarding the type of application for a fieldbus network control, record the obtained information in a storage arrangement, and generate the fieldbus configuration information based on the information provided in the storage arrangement.

According to yet another exemplary embodiment of the present invention certain data associated with the fieldbus network can be obtained, such data including at least one function block, at least one parameter and information regarding at least one device which is capable of being coupled to the fieldbus network. Then, execution of such function block(s) can be scheduled in the device(s) and at least one parameter may be published to the fieldbus network.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION

Exemplary embodiments of the present invention and their advantages may be understood at least by referring to FIGS. 1–17, like numerals being used for like corresponding parts in the various drawings.

Figure 1:
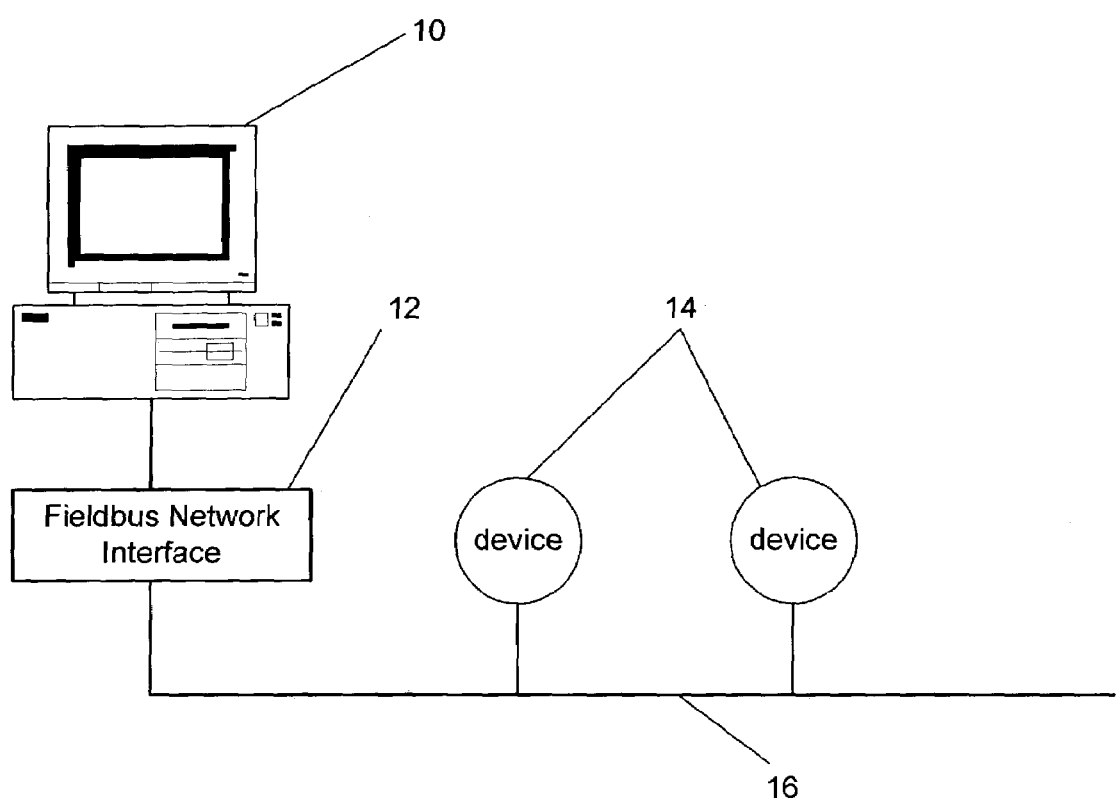
FIG. 1 shows an exemplary embodiment of a system according to the present invention.

FIG. 1 shows an exemplary embodiment of a fieldbus network system with which the logic arrangement, system and method of the present invention may be utilized. A computer apparatus 10 may be connected to a fieldbus network 16 via an interface apparatus 12 (e.g., a Fieldbus Network Interface). The computer apparatus 10 may be a personal computer that includes a processor and memory, and can also be connected to a database and/or to a computer network. The fieldbus network 16 may have attached thereto one or more fieldbus devices 14. The computer apparatus 10 may execute software according to the present invention for providing and/or modifying a configuration of the fieldbus network system which may include, among other elements, the fieldbus network 16 and the fieldbus devices 14.

Figure 2:
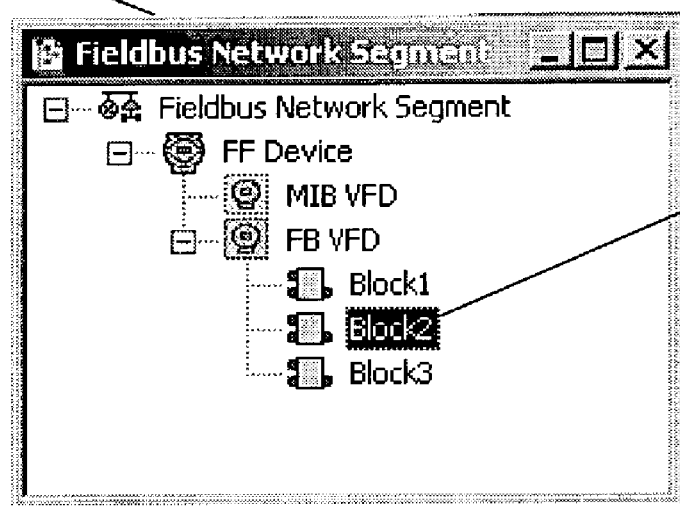
FIG. 2 is a sample screenshot generated by an exemplary embodiment of software used by the logic arrangement, system and method of the present invention for providing an automatic generation of function block tags, with the context being a global context.

FIG. 2 is a sample screenshot generated by software and/or hardware as used by an exemplary embodiment of the logic arrangement, system and method for automatically generating a fieldbus block tag according to the present invention. A screen 20 may contain thereon a fieldbus network segment configuration window 22, which may display a hierarchy of a fieldbus configuration. This exemplary embodiment of the logic arrangement, system and method may first determine the context of the block. The software according to the present invention may generate unique block tag names, e.g., based on the context of the particular device and/or block.

The screen 20 provides a display for an automatic generation of tags, where the selected context for the block tag names can be "Global" context. According to this exemplary embodiment, blocks 24 within such tag generation context can be named as follows: Block1, Block2, . . . BlockN, where N is the total number of blocks in the complete fieldbus configuration.

Figure 3:
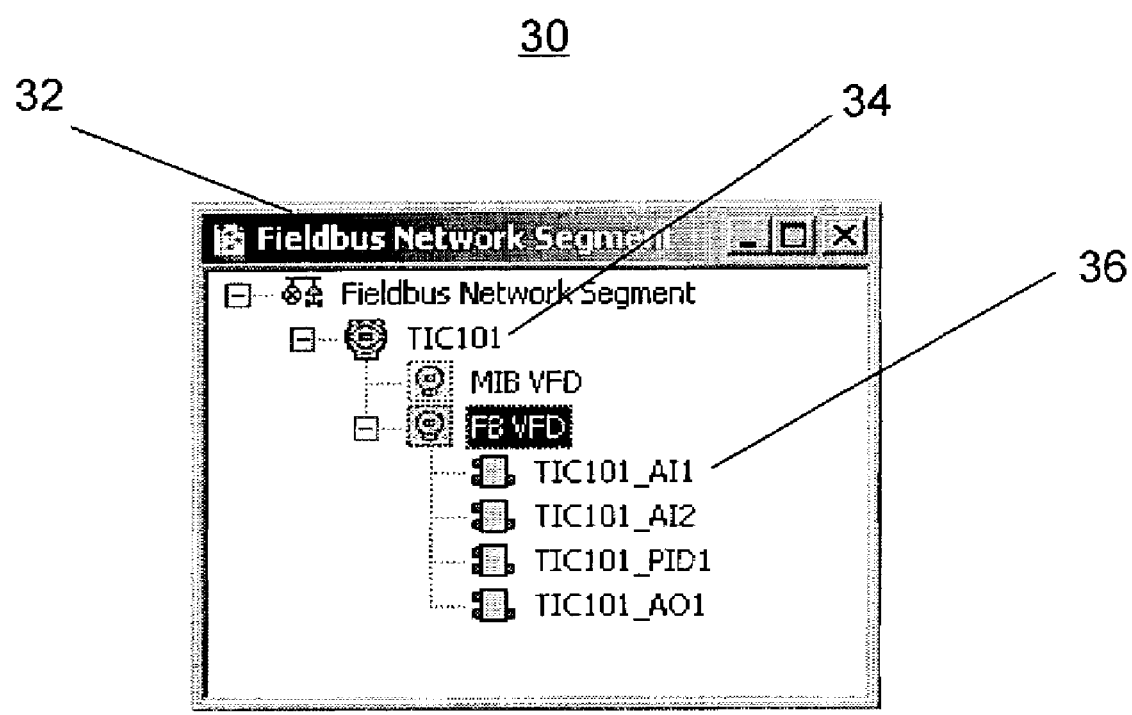
FIG. 3 is a sample screenshot generated by another exemplary embodiment of the software used by the logic arrangement, system and method of the present invention, in which the context is a device context.

FIG. 3 shows another sample screenshot generated by the software/hardware used by the exemplary embodiment of the logic arrangement, system and method according to the present invention. On a screen 30, the selected context can be "Device" context. In this exemplary embodiment, the block tag names may be generated based on the name of the particular device to which the block is allocated. A fieldbus network segment configuration window 32 may contain a device 34 named TIC101. The tag names that may be generated for blocks 36 that are based, at least in part, on the name of the device 34 to which the blocks are allocated. According to the exemplary embodiment generating the window 32 of FIG. 3, the tag naming convention is such that a block tag name can be based on the following format:

<device_name>_<block-type-mnemonic> where the parameter <device_name> is the name of the device 34, and the parameter <block-type-mnemonic> may be defined by the type of function block, e.g., AI1 for the first generated analog input block, AI2 for the next generated analog input block, PID1 for the first generated PID control function block, etc. The separator selected to separate the various parameters in the tag name may be an underscore character for this exemplary embodiment; however, it should be understood that any number of characters may be used as a separator (or none at all) depending upon the particular implementation and/or the choice of a human user.

Figure 4:
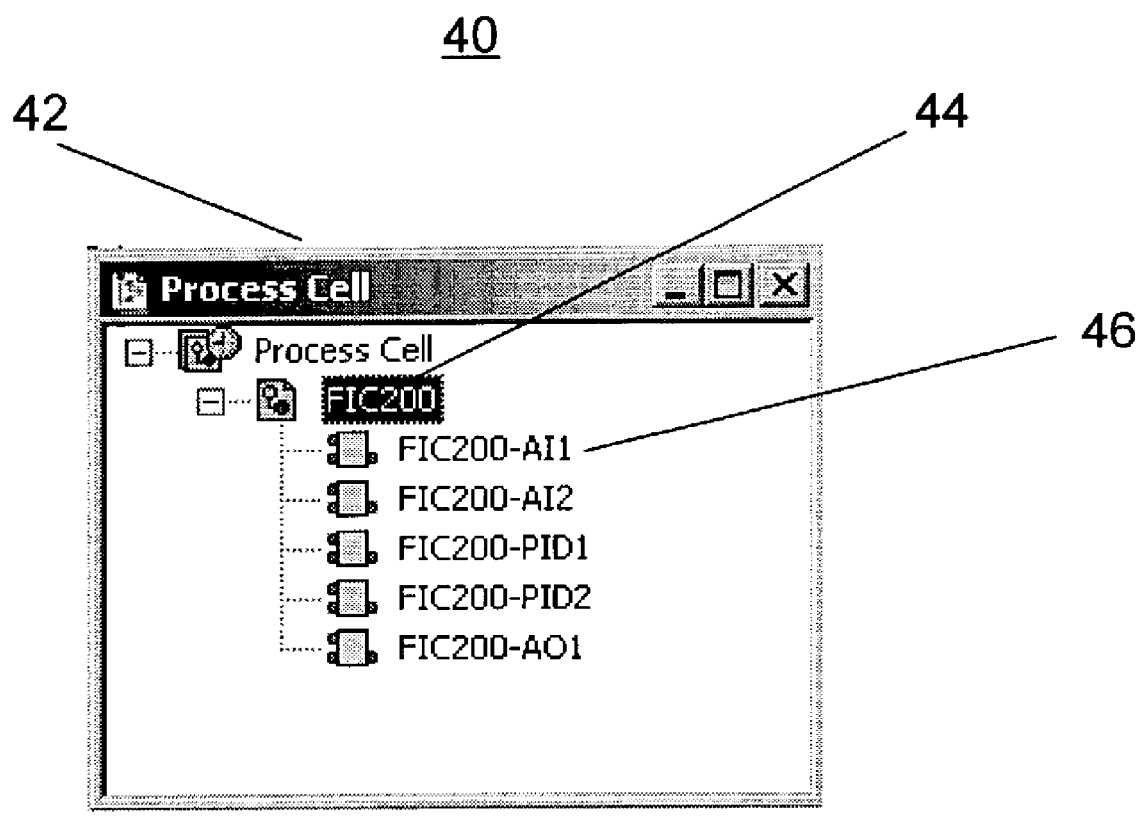
FIG. 4 is a sample screenshot generated by an exemplary embodiment of the software used by the logic arrangement, system and method of the present invention, in which the context is a control module context.

FIG. 4 shows yet another sample screenshot generated by the software/hardware of the exemplary embodiment of the logic arrangement, system and method according to the present invention. On a screen 40, the selected context is a control module context. In this exemplary embodiment, the function block tag names may be generated based on the name of the particular control module to which the function block is allocated. A process cell configuration window 42 may contain a control module 44 named FIC200. The tag names that can be generated for function blocks 46 based, at least in part, on the name of the control module 44 to which the function blocks 46 are allocated. According to the embodiment of the present invention generating the window 42 of FIG. 4, the tag naming convention is such that a function block tag name is based on the following format:

<controlmodule_name>_<block-type-mnemonic> where the parameter <controlmodule_name> can be the name of the control module 44, and the parameter <block-type-mnemonic> may be defined as provided above by the type of function block, e.g., AI1 for the first generated analog input block, AI2 for the next generated analog input block, PID1 for the first generated PID control function block, etc. The separator that may be selected to separate the various parameters in the tag name can be a hyphen character for this exemplary embodiment.

The exemplary embodiment of the software used to automatically generate fieldbus function block tags according to the present invention can define additional contexts. One additional context may be a predefined default context. A predetermined format may be established for a default tag, which can be based on a scheme similar to those described above. In addition, the context may be based on the class of the function block. According to one exemplary embodiment of this default tag name generation scheme, resource blocks and transducer blocks may have a device context, while function blocks may have a control module context. One reason for such a distinction is that according to their definitions in the Foundation Fieldbus specifications, resource blocks and transducer blocks can be intimately related to the hardware of the particular device, while function blocks are basic building blocks of control modules. Different default tag generation formats may also be used.

Figure 5:
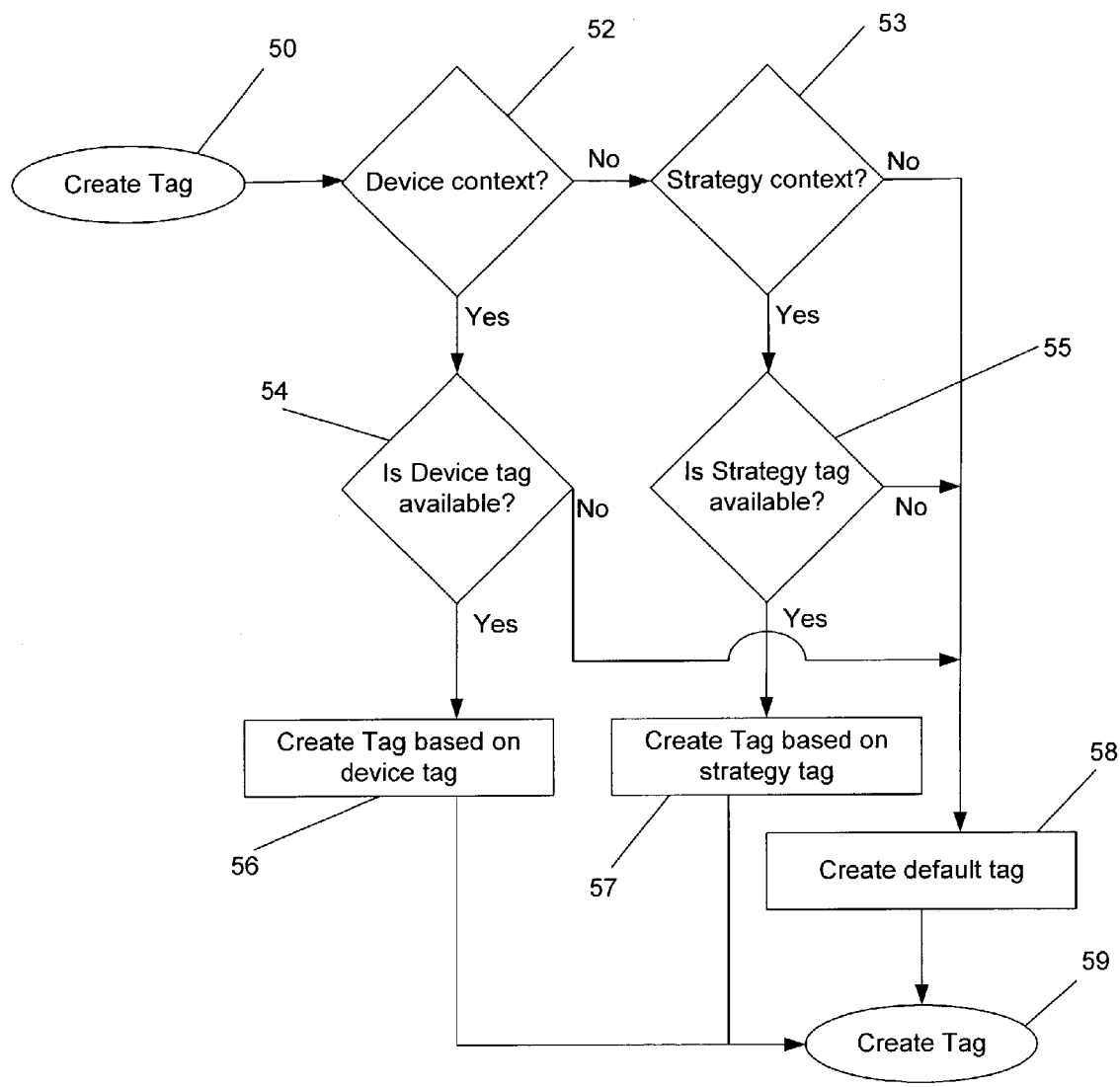
FIG. 5 is a flow diagram for an exemplary embodiment of the method according to the present invention provided for an automatic generation of function block tags.

FIG. 5 shows an exemplary embodiment of a method according to the present invention for automatically generating the function block tags. The exemplary method may first determine whether the context is a device context in step 52, and/or if the context is a strategy context in step 53. If neither context is selected, the method may then automatically create a tag based on a default scheme in step 58. However, if the context is a device context, the method may then determine if the block is attached to a device in step 54. If the block is attached to a device then a device tag is available and the function block tag may be generated based on that device tag (step 56). Otherwise, a default tag may be generated in step 58. If the context is a strategy context, in step 55, it is possible to verify whether a strategy tag is currently available. If the strategy has a particular tag, the function block tag is automatically generated based on the strategy in step tag 57. Otherwise, the function block may then be named based on the default naming scheme in step 58. In step 59, the tag can be generated.

In another exemplary embodiment of an automatic fieldbus function block tag generation software (or hardware) according to the present invention, the logic arrangement, system and method may be implemented to maintain the consistency of the block tags when the function blocks are moved within the configuration such that their context changes. For example, in one exemplary fieldbus network configuration, the context is a device context, and an analog input function block may, e.g., have a tag name "TIC101_AI1." If the function block is then moved from the device TIC101 to a device TIC202, a new tag "TIC202_AI1" may be generated for the analog input function block so as to maintain the consistency of the naming convention. Similar operations may also be performed to maintain consistency where the context is control module, global, default, or some other context.

Further, if the context itself is changed in the configuration, rather than moving the function block, the exemplary embodiment of the logic arrangement, system and method of the present invention may maintain consistency of the function block tag names by generating new tags so as to match the new context. For example, in one exemplary configuration, the context of a configuration can be a device context, and the configuration may contain an analog input function block with the current tag of, e.g., "TIC101_AI1." If the context itself is changed to the control module context, the exemplary embodiment of the logic arrangement, system and method may automatically generate a new tag for this function block, e.g., "FIC100_AI1." Similarly, if the tag of the context changes, the block tags that are dependent on that context will follow the change to remain consistent. Various other modifications of these naming rules and conventions may also be implemented.

Numerous other situations may arise where the logic arrangement, system and method of the present invention may attempt to generate a new tag for the function block, but the tag may not be available, e.g., when the context, is a device context but the function block is not yet attached to any device. In such cases, the logic arrangement, system and method may generate a default to be a different context for purposes of generating a temporary tag name, and can additionally include another designation in the tag so as to indicate that the current tag was created as a "placeholder," e.g., a different separator than the selected separator may be used, etc.

In another exemplary embodiment of the present invention, the logic arrangement, system and method may be implemented for ensuring a consistent allocation of function block types into the appropriate devices. For example, when the user attempts to allocate a function block to a particular device in a fieldbus network configuration, the logic arrangement, system and method of the present invention may determine whether the type of function block is supported by the particular field device. Standard parameters defined in the specification for the fieldbus network protocol may be used to perform the verification. In one exemplary embodiment of the present invention (as implemented for the use with a Foundation Fieldbus network), the following standard parameters may be used to perform the verification: Manufacturer code, Profile, ProfileRevision, DDIdentification and DDItemId. Based on the parameters (with the number of parameters checked varying with the particular implementation of the present invention), the logic arrangement, system and method can determine the type of the function block. The function block types may include a "Standard" block, the parameters of which are explicitly defined in the Foundation Fieldbus specification; an "Enhanced" block, which is a standard block extended by appending proprietary parameters at the end of the block; a "Custom" block, a proprietary block definition whose parameter set is fully defined by the manufacturer; and an "Enhanced Custom" block, which is a custom block extended by appending proprietary parameters at the end of the block.

The types of function blocks that may be supported by a particular device can be found in that device's Capabilities File and described in that device's Device Description (DD) as defined in the Foundation Fieldbus specification. The logic arrangement, system and method can therefore match the type of the function block that is being added to the device with the device's supported function block types. If the function block type is supported by the device, then the function block may be added to the device. Otherwise, the operation may be aborted, and/or additional steps may be performed to conform the function block to operate with the particular device.

Figure 6:
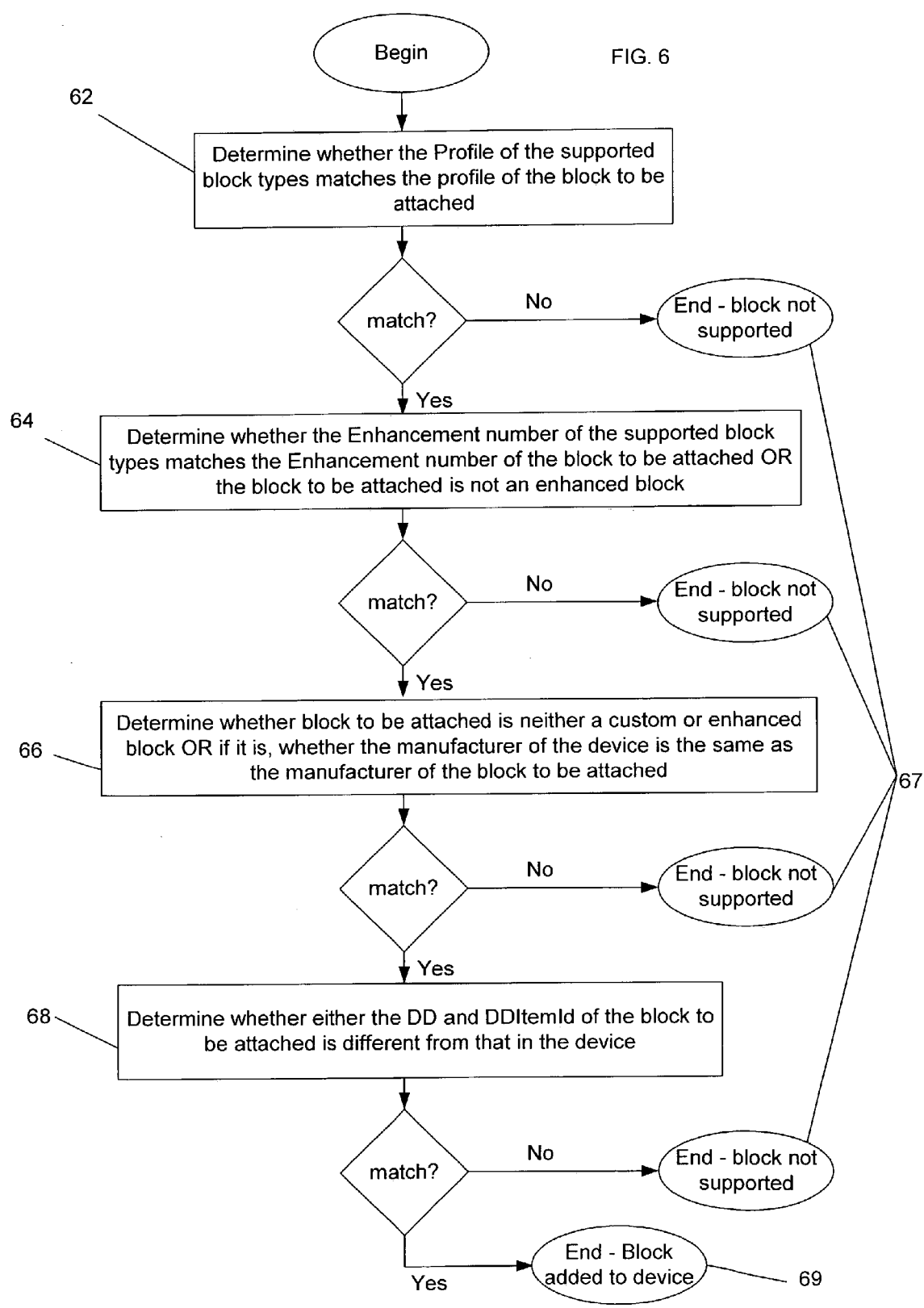
FIG. 6 is a flow diagram of an exemplary embodiment of the method according to the present invention provided for determining whether a function block type is supported by a particular device.

One exemplary embodiment of a method for checking block type consistency according to the present invention is shown in FIG. 6. In particular, steps 62, 64, 66 and 68 may be used to determine whether all the requirements for block-type consistency are met. The requirements in this exemplary embodiment of the method are that the Profile of at least one of the supported block types should match the Profile of the block to be attached (step 62), the enhancement number of the available block type matches the enhancement number of the block to be attached or the attached block is not an enhanced block (step 64), the block to be attached is neither a custom block nor an enhanced block or if the block to be attached is one of these types, then the manufacturer of the device is the same as the manufacturer of the block to be attached (step 66), and the DD of the block to be attached should be different from that in the device or if the DD is same then the DDItemId of a supported block type should match the DDItemId of the block to be attached (step 68). If all of these requirements are met, then it is determined that the block may be added to the particular device in step 69. However, if any of these criteria are not met, it is determined that the block is not supported (step 67).

Upon the determination that a particular function block is not supported by a device, several exemplary actions may be performed, depending on the implementation of the logic arrangement, system and method of the present invention. The logic arrangement, system and method may simply abort the operation, and generate a warning message. Alternatively, the logic arrangement, system and method may allow for the function block to be reconciled with the supported function block types of the device so that it can still be attached. The manner in which the function block may be reconciled can vary depending on the implementation. In one exemplary embodiment of the present invention, the following reconciliation rules may generally apply (these rules may vary depending on the particular implementation):

Block can be attached to a device if the device supports an enhanced version of that type of block.
Enhanced block can be added to a device if the device supports a non-enhanced version of that type of block only if the user is warned about the loss of information and accepts it. The common parameters would not be checked. The parameters of enhanced part of the blocks may be lost.
Enhanced block can be added to a device if the device supports a different enhancement of the same base block type only if the user is warned about the loss of information and accepts it. The common parameters would not be checked. The parameters of enhanced part of the blocks would be compared for association, automatically or upon -continued instructions from the user, and the user may confirm the changes.
Block can be added to a device that does not support either that block type or an enhancement version of it provided that the user chooses a base block type and reconciles the parameters individually.
For resource blocks in particular, because the resource block for Interoperability Test Kit (ITK) 4.0 is an enhancement of the previous ordinary resource block definition, the following rules may apply:
    Ordinary resource block can be attached to a device that
    supports a resource block for ITK 4.0 but the block type (the
    Profile) should change to reflect the operation.
    Resource block for ITK 4.0 can be attached to a device
    that supports an ordinary resource block but the block type (the
    Profile) must change to reflect the operation, and the user should
    be warned about the loss of information.

Figure 7:
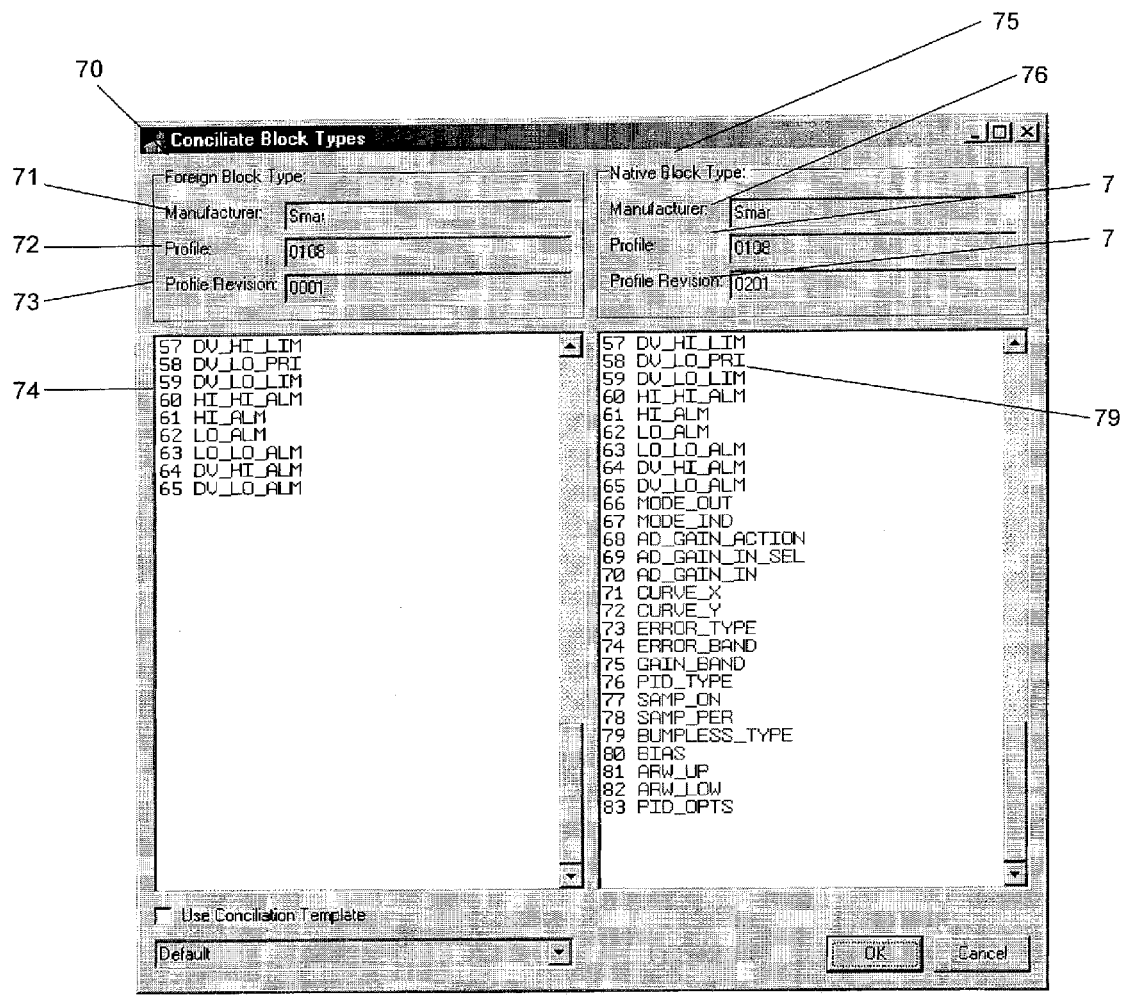
FIG. 7 is a sample screenshot generated by the exemplary software of the present invention for maintaining function block-type consistency by comparing the supported function block with the function block to be associated with the particular device.

In another exemplary embodiment of the logic arrangement, system and method according to the present invention for ensuring the consistent allocation of function block types into the appropriate devices (where a particular function block is not supported by the device), a user-assistant may be invoked to aid the user in identifying and resolving inconsistencies so as to force the attachment of the function block to the device. FIG. 7 shows a sample screenshot generated by an exemplary software implemented according to the present invention. A window depicted in FIG. 7 illustrates a visual representation of the parameters analyzed in the consistency check. A foreign block type 70 of the window represents the function block which the logic arrangement, system and method are attempting to attach to the device, and includes a Manufacturer number 71, a Profile number 72, a Profile Revision 73, and parameters 74. A native block type 75 is one of the block types supported by the device to which the function block is being attached, and includes Manufacturer number 76, a Profile number 77, a Profile Revision 78, and parameters 79. As shown in the parameter lists 74 and 79, the foreign function block type 70 can be compatible with the device because the supported native function block type is an enhanced block, while the foreign block is a standard block. All of the parameters 74 of the foreign block 70 may be contained in the native block 75. However, the additional parameters of native block 75, which are not included in the foreign block 70 may be configured before the function block, can be attached to the device. These parameters may be displayed in a different color, or identified in some other manner as a status indication to the user.

Figure 8:
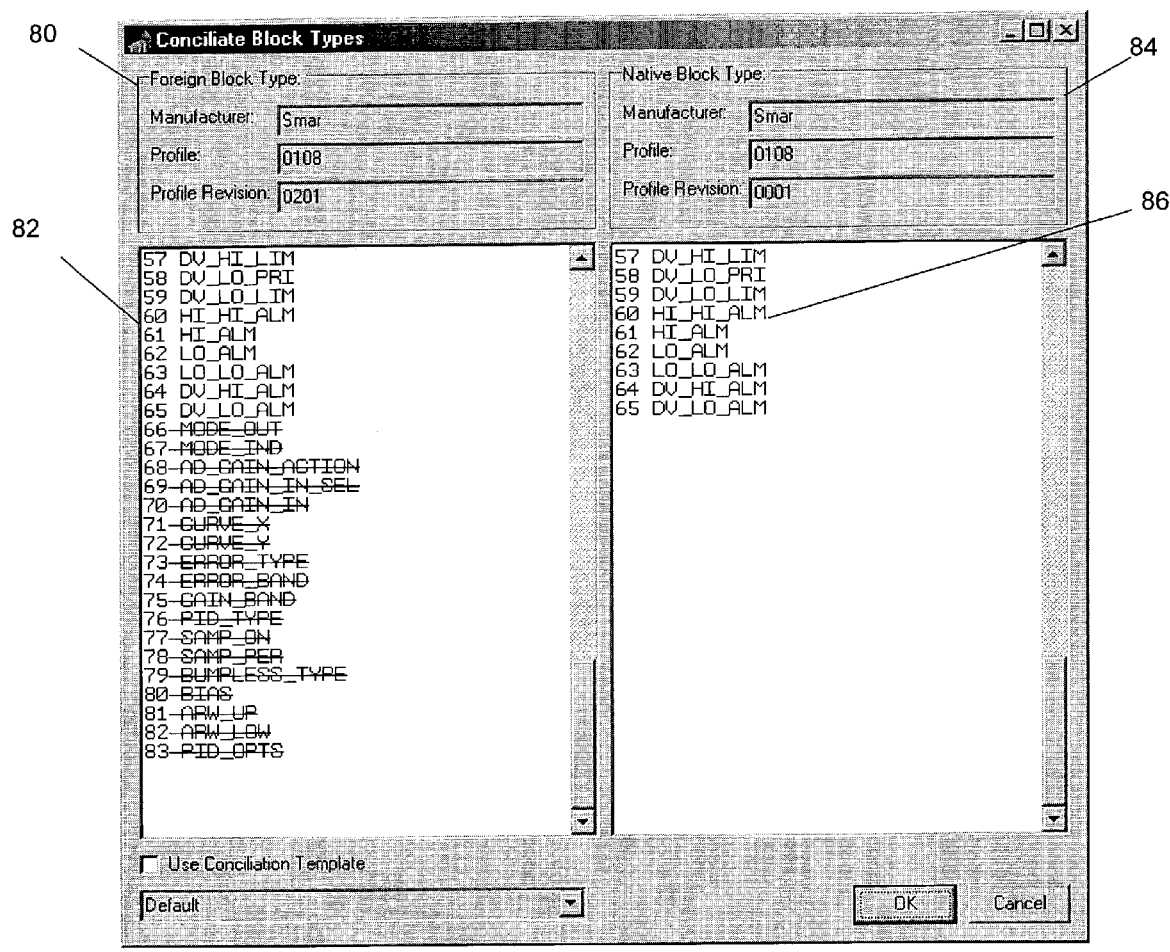
FIG. 8 is another sample screenshot generated by the software of the present invention.

The exemplary embodiment of the software used by the logic arrangement, system and method of the present invention shows a sample screenshot in FIG. 8 for a comparison of a foreign block of enhanced type as compared to a device supporting a standard block type. In this exemplary illustration, a foreign block type 80 includes parameters 82, and a native block type 84 includes other parameters 86. Because the foreign block type 80 includes certain parameters which are not contained in the native block type 84, these parameters may be clipped out or removed in order to allow for the function block to be attached to the device. These additional parameters may be shown in a different color or marked differently in some other way, as they are marked with, e.g., a strikethrough in FIG. 8.

Figure 9:
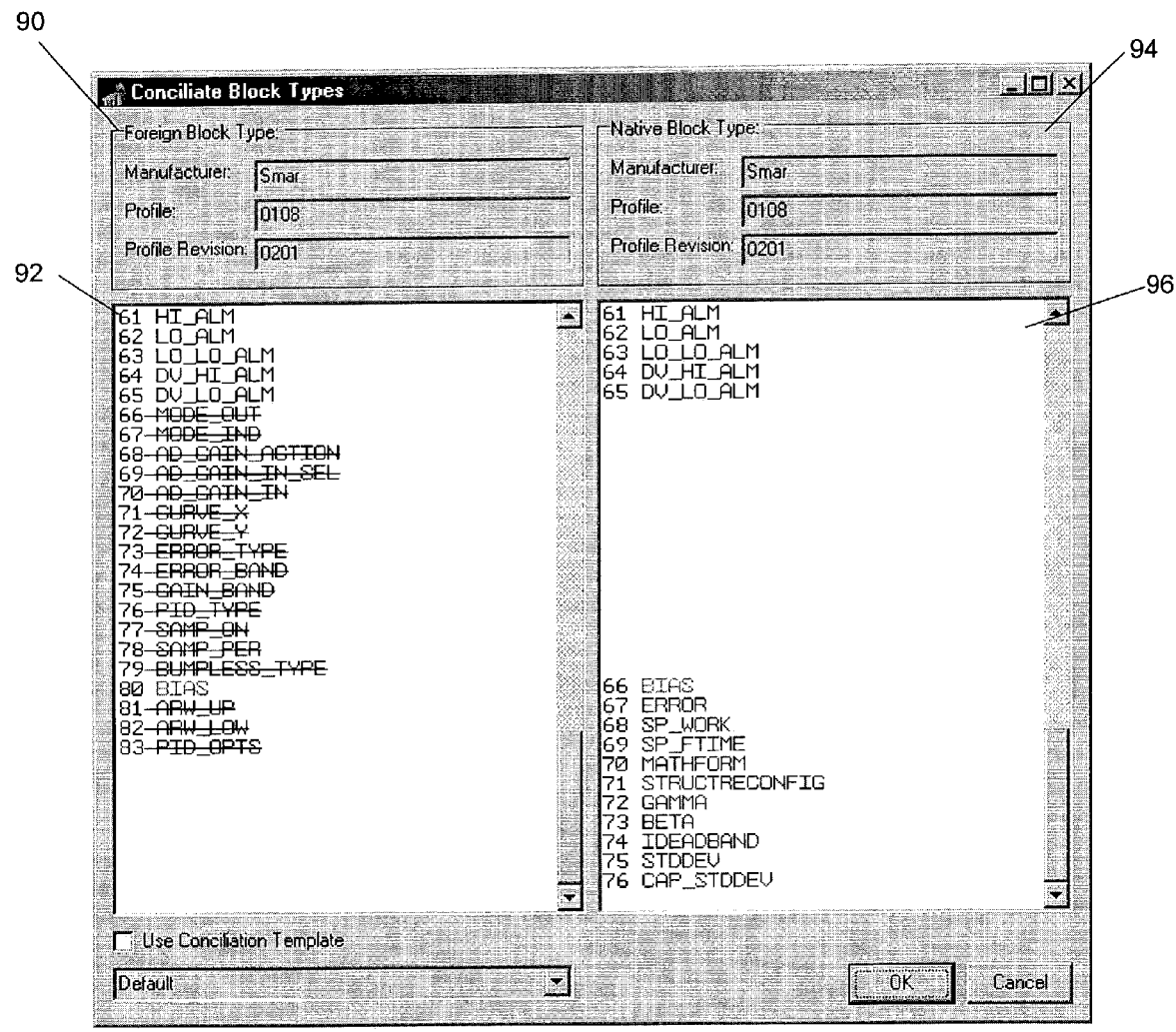
FIG. 9 is yet another sample screenshot generated by the software of the present invention.

The exemplary embodiment of the software used by the logic arrangement, system and method of the present invention shows another sample screenshot in FIG. 9 for a comparison when the foreign block type and the native block type are both of an enhanced type, but are from different manufacturers. The foreign block type 90 includes parameters 92, and the native block type 94 includes other parameters 96. Each block type contains the parameters which are not contained by the other block type. The logic arrangement, system and method of the present invention may handle this scenario in numerous ways, including alerting the user to the mismatched parameters, obtaining confirmation from the user to clip out unsupported parameters, etc.

As indicated above, the parameters displayed in the displays and windows may be shown in various colors or formats to alert the user as to their status. In one exemplary embodiment, a parameter that has no match in the native block (and will be clipped out) may be shown in red with a strikethrough, a parameter that has no match in the foreign block (but is contained in the native block) may be shown in green, a foreign parameter which has the same name and structure (but different basic type as that in the native parameter such that it will match under a type conversion) may be shown in yellow, etc. In addition, the user can force the comparison and matching of the parameters which may not be matched by the logic arrangement, system and method because they may have different names. Likewise, the user can disassociate parameters that are automatically associated together by the logic arrangement, system and method of the present invention. The user can perform additional functions, such as defining values, etc. Indeed, the user may be allowed to intervene and override some or all steps of the reconciliation process.

A reconciliation template may be implemented in the exemplary embodiment of the present invention for maintaining block type consistency. Rather than displaying to the user the interface for every single function block in the reconciliation process, a template may be utilized to automatically process same or all function blocks in a particular batch in a substantially similar manner. A log may be generated during the batch processing such that the user may be informed regarding any inconsistencies that were encountered during the reconciliation process.

In another exemplary embodiment of the present invention, the logic arrangement, system and method may be implemented for providing a fieldbus configuration generation assistant. Such assistant may be implemented using software and/or hardware, and can include database capabilities for storing various information regarding fieldbus network configurations such as complete configurations, templates, information related to devices and other fieldbus components, etc. The software/hardware may automate steps of the fieldbus network configuration process, and may provide information and templates to the user so as to aid the user in configuring the fieldbus network. Additionally, the user may provide information regarding the needs of the fieldbus network, the type of application (pasteurization, flow control, chemical process, etc.) and additional information, and the assistant according to the present invention may provide the fieldbus configuration based on the information stored in a knowledge base kept in a database, storage device and/or elsewhere. In this manner, the user would only need to have limited knowledge of the fieldbus networks in order to configure such fieldbus network.

Figure 10:
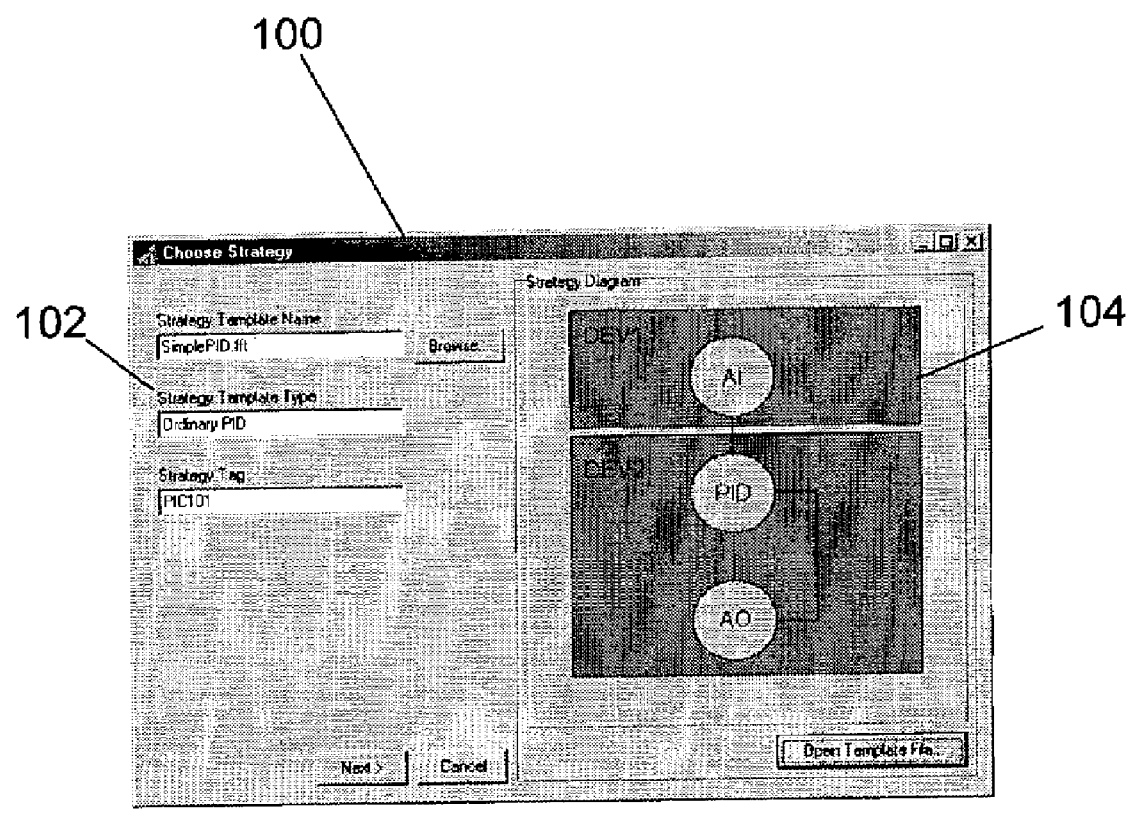
FIG. 10 is a sample screenshot generated by an exemplary embodiment of software assistant according to the present invention, showing a window for selecting a strategy template, and providing a tag name therefor.

FIG. 10 shows a first sample screenshot generated by an exemplary embodiment of the logic arrangement, system and method of the present invention. As illustrated in FIG. 10, a window 100 may be displayed to the user so as to aid the user in selecting a template for a control strategy in an exemplary fieldbus network configuration. The window 100 may include control strategy template information 102 regarding a particular control strategy template, and a control strategy diagram 104 which may provide information about the control strategy, such as the contained function blocks, links between the function blocks, attachment to devices, etc. The logic arrangement, system and method may also provide additional information to the user so as to aid the user in selecting, e.g., the best strategy template for the application.

Figure 11:
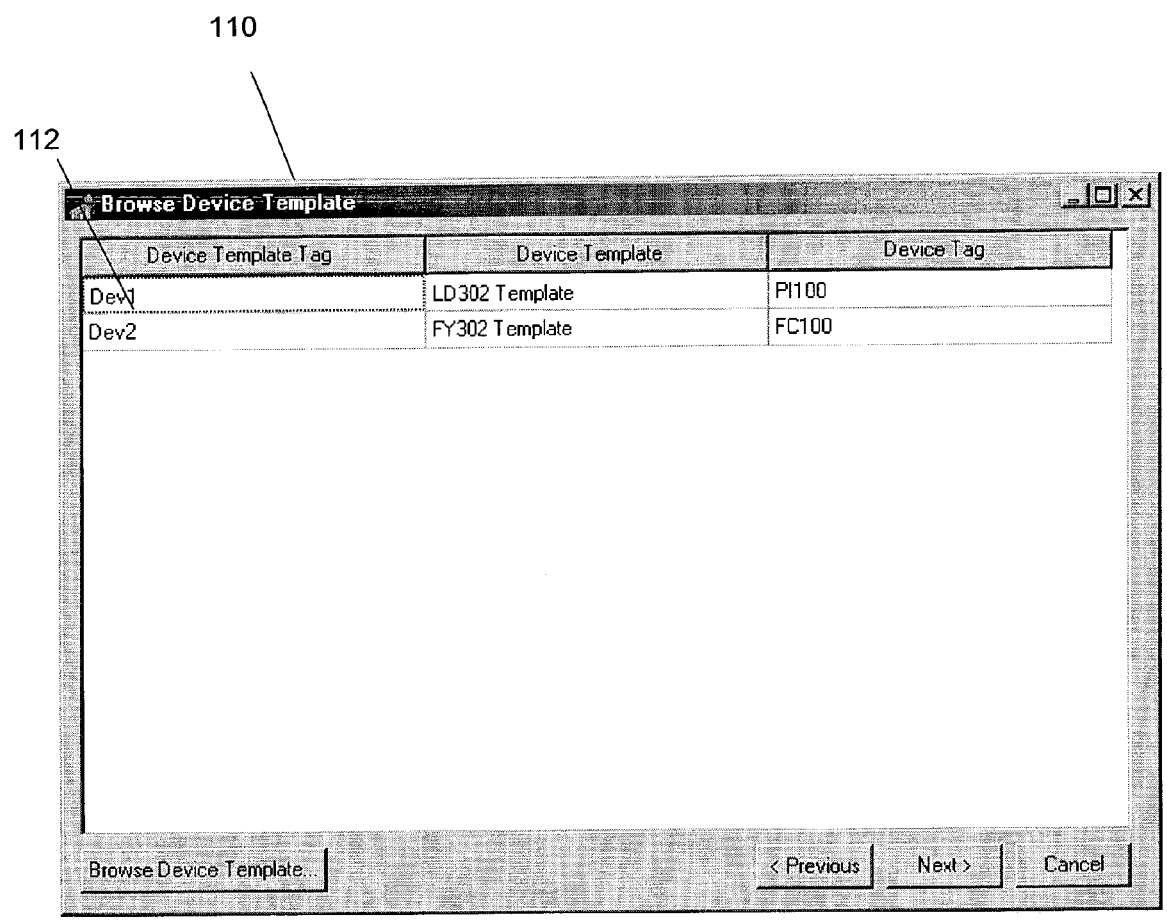
FIG. 11 is a sample screenshot generated by the exemplary software assistant which shows a window for selecting device templates.

FIG. 11 shows the next sample screenshot generated by the exemplary embodiment of the logic arrangement, system and method. A window 110 of FIG. 11 may be displayed to the user to also aid such user in selecting a template for a particular device in a fieldbus network configuration (as with the window 100 of FIG. 10). A window 110 may include information regarding one or more device templates 112. The user may select particular devices by selecting a corresponding device template from the window 110 to be used in the fieldbus network configuration. The logic arrangement, system and method can provide information to the user to aid the user in selecting the devices. Additionally, the user can define device tags for each device individually.

Figure 12:
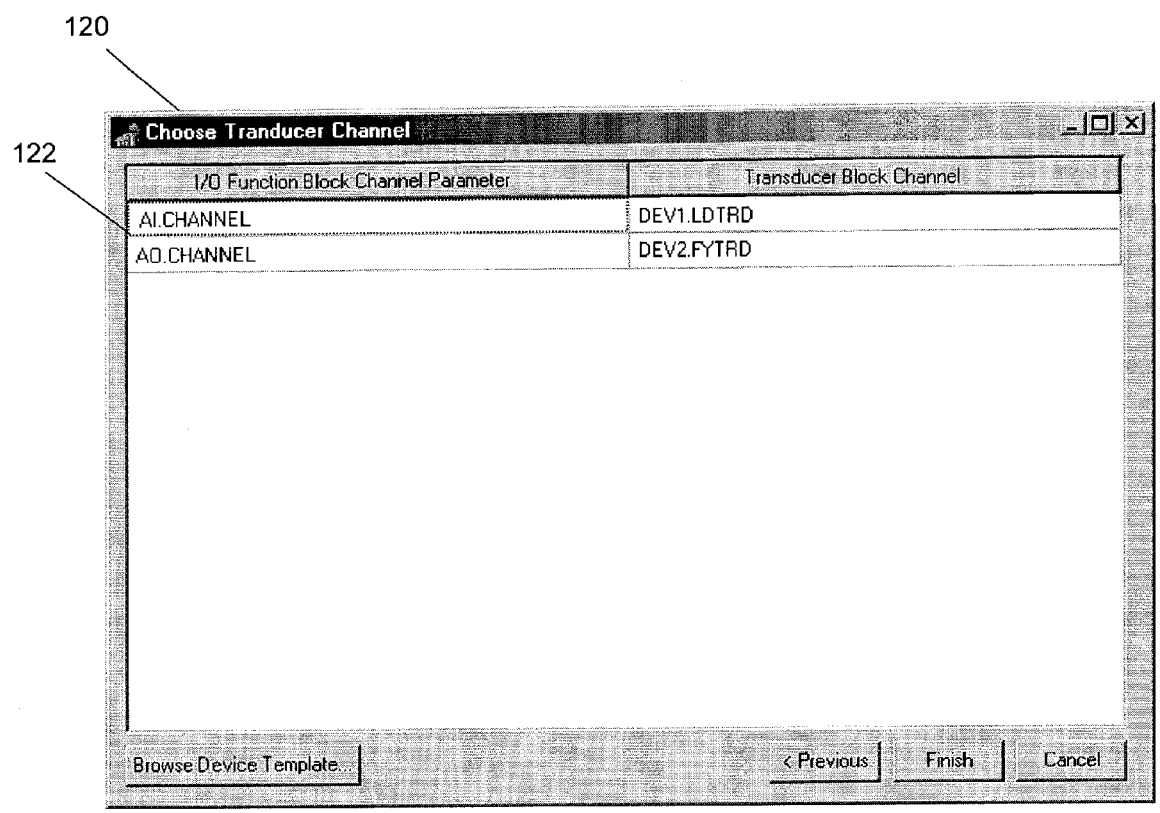
FIG. 12 is a sample screenshot generated by the exemplary software assistant which shows a window for associating input/output function blocks with transducer channels.

FIG. 12 shows yet another successive sample screenshot of an exemplary embodiment of the logic arrangement, system and method. A window 120 of FIG. 12 may be displayed to the user to assist the user in associating input/output function blocks with transducer channels within the particular device. A window 120 may include information 122 regarding the input/output (I/O) function block channel parameters and available transducer function block channels. The user may associate the I/O function blocks shown in window 120 with particular transducer block channels in the device.

Based on the information provided by the user in the screens of FIGS. 10-12, the configuration assistant according to the present invention may complete the configuration of the fieldbus network by automatically instantiating some or all of the necessary or preferred function blocks, assigning tags to the function blocks, instantiating some or all of the function block links in the strategy, instantiating the devices by utilizing a device template, assigning the tags to each device, instantiating the resource block and transducer blocks in each device, assigning the tags to the resource blocks and transducer blocks, assigning each function block to its respective device, and connecting the channel of the I/O function blocks to the corresponding transducer block channels. This exemplary procedure of the present invention effectively automates some or all of the configuration process. Depending on the implementation of the present invention, different types of information may be collected from the user, and different steps of the configuration process may be automated by the configuration assistant. The generation of tags for the blocks may use any one of the automatic block tag generation schemes already mentioned and one further method is possible when dealing with block templates. The tags can be based on block aliases provided in the templates in substitution to block mnemonic. If the selected context is a device context, the structure of the tag may be as follows:

<device_name>_<block-alias-in-template> where the parameter <device_name> is the name of the device. If the selected context is a control module context, the structure of the tag may be as follows:

<controlmodule_name>_<block-alias-in-template> where the parameter <controlmodule_name> can be the name of the control module. The block alias is a short tag for the block in the strategy template and may refer to the role of the block in the strategy.

In another exemplary embodiment of the present invention, the logic arrangement, system and method may be implemented for the off-line scheduling of function block execution and network traffic. The logic arrangement, system and method may utilize a scheduling algorithm which is known in the art, such as the algorithm disclosed by Jia Xu in "Multiprocessor Scheduling of Processes with Release Times, Deadlines, Precedence, and Exclusion Relations," (IEEE Transactions on Software Engineering, Vol. 19, No. 2, February 1993, pp. 139–54) and disclosed by Xu and David Parnas in "Scheduling Processes with Release Times, Deadlines, Precedence, and Exclusion Relations," (IEEE Transactions on Software Engineering, Vol. 16, No. 3, March 1990, pp. 360–9), both incorporated herein by reference. The scheduling arrangement and method according to the present invention can schedule function block application processes, which includes the execution of function blocks in the devices and the publishing of output parameters to the fieldbus network (in accordance with a scheduling algorithm), and additionally may be configured to distribute the function blocks to the fieldbus devices. Some or all of the scheduling functions may be performed off-line, e.g., without the need for a connection to a physical fieldbus network installation. Indeed, the scheduling functions may also be performed prior to the physical installation of the fieldbus network, thus providing an opportunity to analyze scheduling issues prior to the physical implementation of the fieldbus network. The control strategies preferably contain some or all of the information that may be required to perform the scheduling functions off-line, e.g., the micro-cycles and macro-cycles, function blocks and their corresponding links, the assignment of function blocks to devices, the nature of links between the function blocks (i.e., internal, within a particular device, or external to the devices, between different devices), precedence relations among the tasks, exclusion relations among the tasks, etc.

Figure 13:
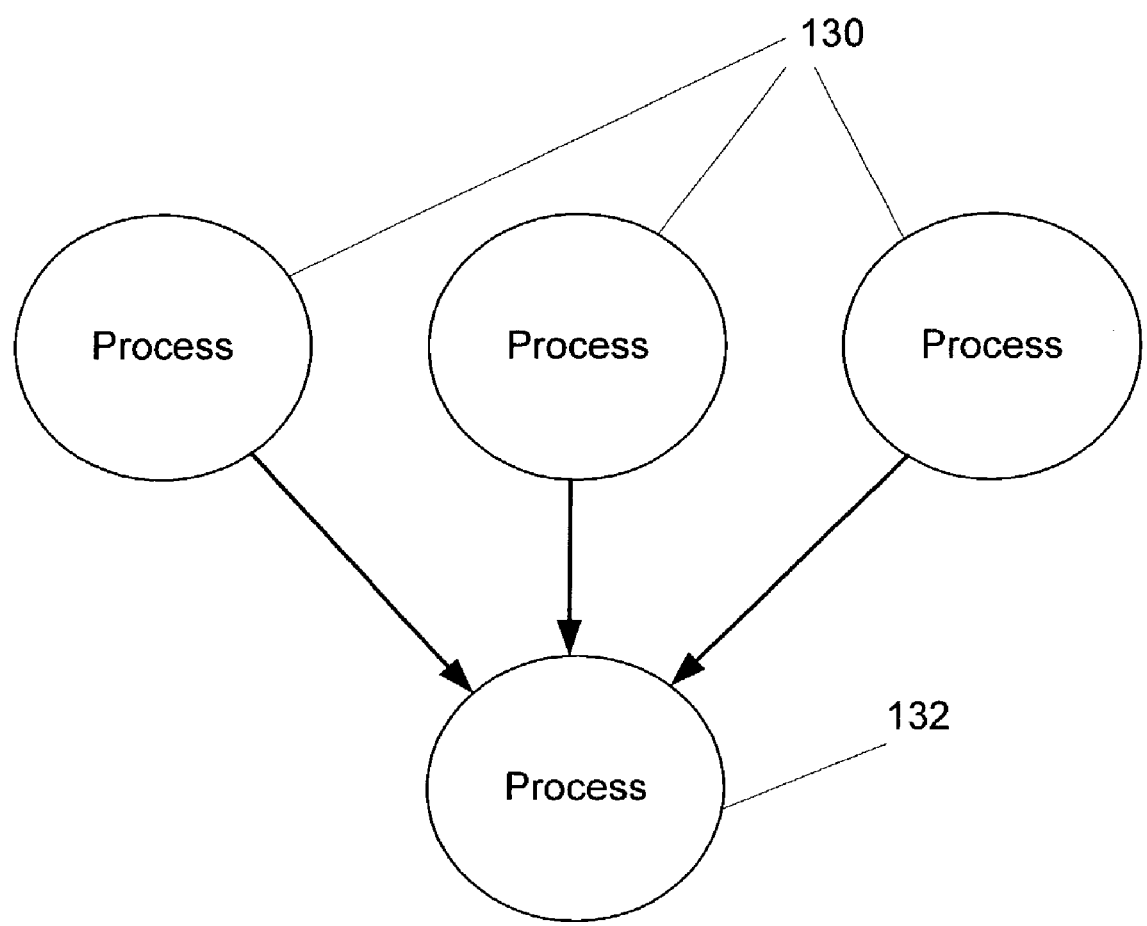
FIG. 13 shows a diagram of scheduled processes for a fieldbus network control strategy with converging branches generated by an exemplary embodiment of the logic arrangement, system and method according to the present invention.
Figure 14:
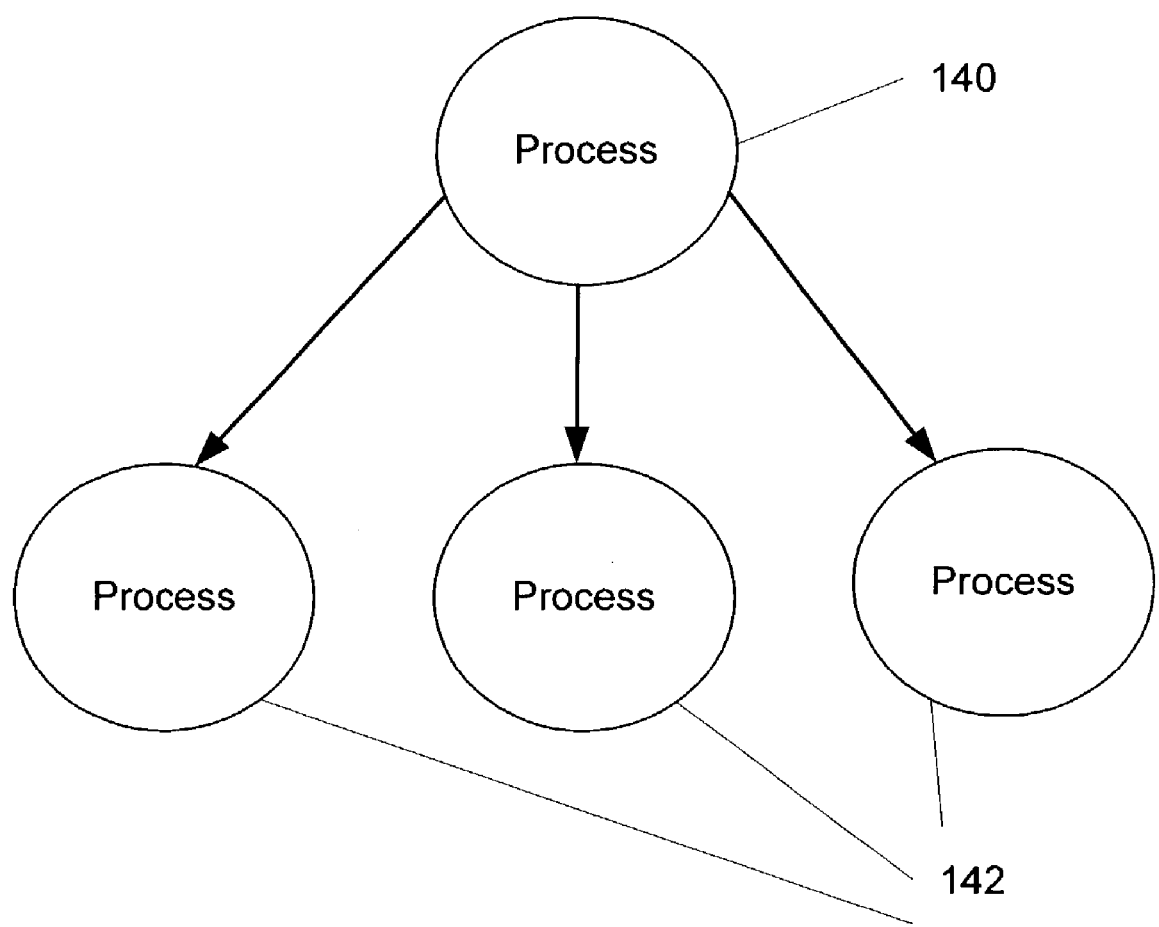
FIG. 14 shows a diagram of scheduled processes for a fieldbus network control strategy with diverging branches generated by the exemplary embodiment of the logic arrangement, system and method according to the present invention.
Figure 15:
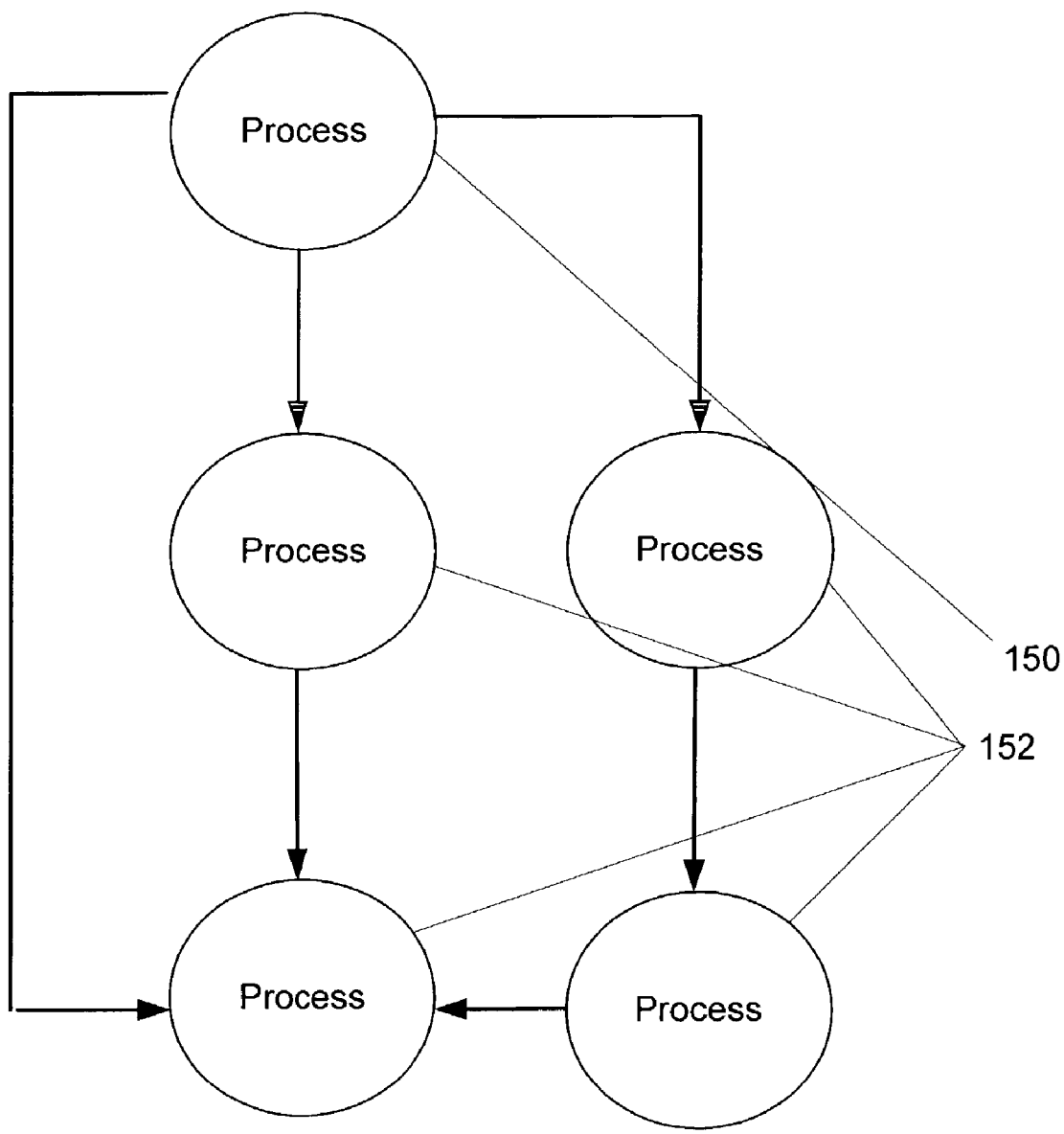
FIG. 15 shows a diagram of scheduled processes for a fieldbus network control strategy with parallel paths generated by the exemplary embodiment of the logic arrangement, system and method according to the present invention.
Figure 16:
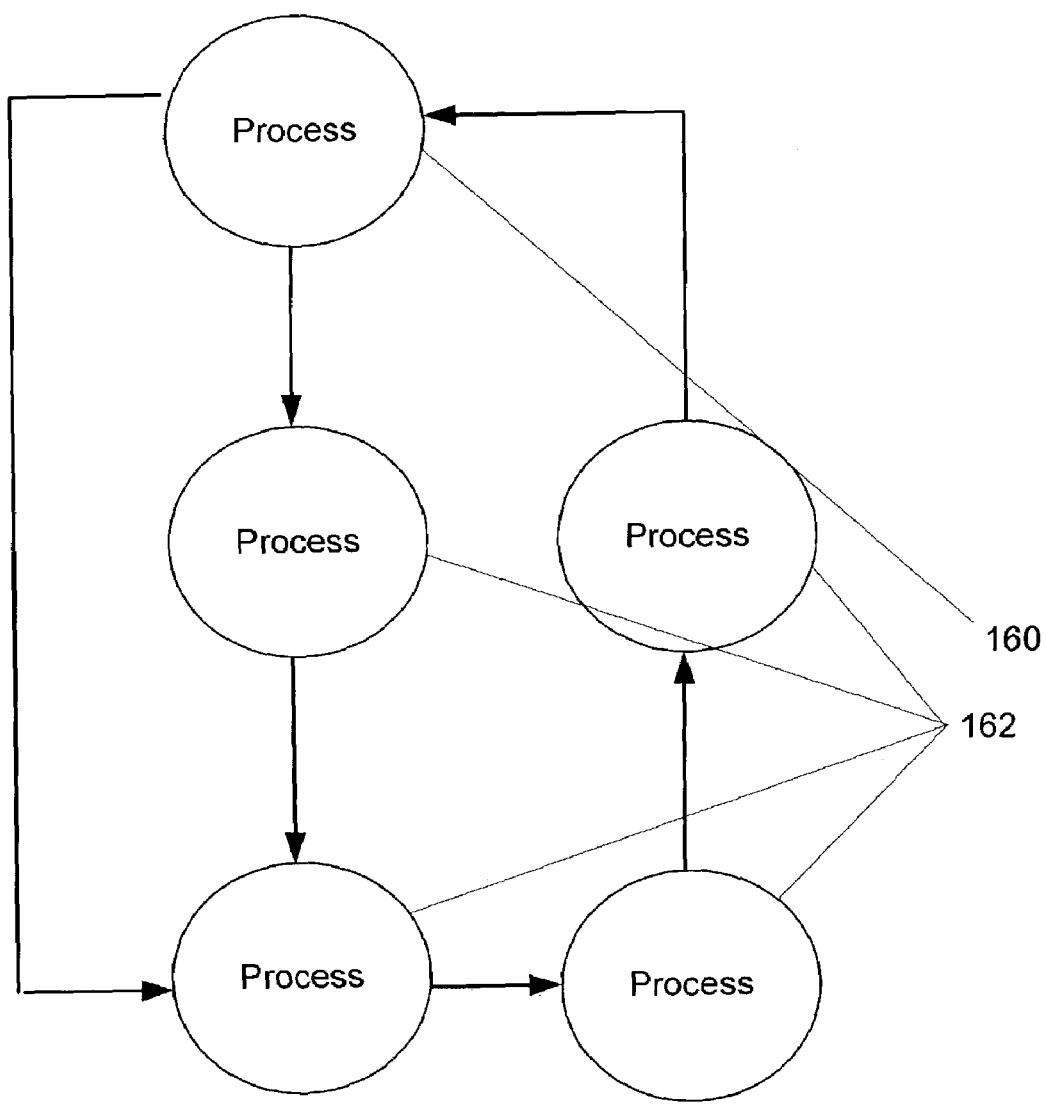
FIG. 16 shows a diagram of scheduled processes for a fieldbus network control strategy with a feedback path generated by the exemplary embodiment of the logic arrangement, system and method according to the present invention.

The scheduling arrangement and method of the present invention may be configured to implement a schedule for numerous different types of control strategies, which may be utilized on a particular segment of the fieldbus network. For example, as shown in FIG. 13, a control strategy for a particular network branch may involve converging branches. Exemplary processes 130 may all converge and provide input data to process 132. The scheduling arrangement and method of the present invention may be configured to ensure that the scheduling of the various processes coincides such that a process 132 is not executed until the converging processes 130 are completed. As shown in FIG. 14, the scheduling arrangement and method of the present invention may also be configured to properly schedule processes in the fieldbus network segment where diverging paths are utilized. For example, a process 140 diverges, and provides inputs to multiple diverging processes 142. Other cases may similarly be handled where the processes 150, 152 operate in parallel paths, as shown in FIG. 15, and when processes 160, 162 operate with feedback paths, as shown in FIG. 16. The scheduling arrangement and method of the present invention may be configured to ensure that a parameter publishing can be synchronized with the execution of the function blocks, e.g., output parameters shall be published to the fieldbus network after the block it belongs to executes, and an input parameter is published before such execution of the block to which it belongs. Additionally, the scheduling arrangement and method may verify that there are no ambiguities in block-execution precedence, identify feedback loops in the control strategy, and can be configured to satisfy certain restrictions that are created by limits on available resources. In these ways, the scheduling arrangement and method of the present invention may ensure a proper operation of the processes in accordance with the provided control strategy.

Additionally, the scheduling arrangement and method may allow for the control strategies in the same fieldbus network segment to have different micro-cycles, make provision for the time used for fieldbus network traffic supervision, and further verify a central processing unit (CPU) available time so as to ensure efficient operation of the schedule.

The scheduling arrangement and method may also allocate the output parameters to the link active schedule ("LAS") processor of the fieldbus network. The LAS processor is preferably the component which controls the scheduling of traffic on the fieldbus. This may be preferable in certain applications, because the output parameters may always be published to the network, and thus they may have to be allocated to the LAS processor in order to effectuate proper network operation in accordance with the fieldbus protocol.

Further, the scheduling arrangement and method according to an exemplary embodiment of the present invention may also ensure the proper allocation of the function blocks to the devices. In particular, I/O function blocks generally are executed in the same device as their associated transducer block. This is due to the fact that they are connected by a channel internal to the fieldbus device. Accordingly, the scheduling arrangement and method of the present invention may be configured to ensure that the function blocks are distributed to the devices such that this relationship is maintained, i.e., I/O function blocks may be allocated to the same devices as their respective transducer blocks.

Figure 17:
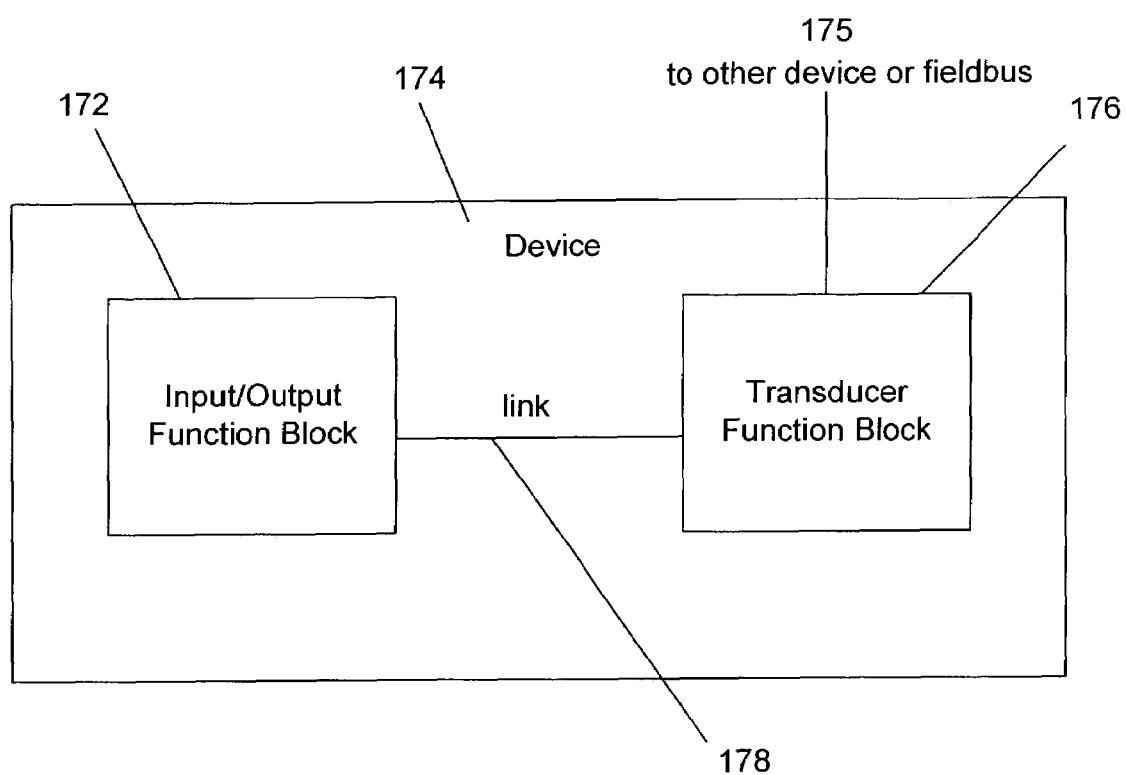
FIG. 17 shows an exemplary fieldbus network device containing two function blocks which are linked within the device using the logic arrangement, system and/or method according to the present invention.

As shown in FIG. 17, an exemplary device 174 may contain the input/output function block 172 and the transducer block 176. As the scheduling arrangement and method allocate function blocks to various devices in this exemplary fieldbus network configuration, they can also arrange that the blocks 172, 176 are allocated to the same device, since the connection between such blocks is likely internal to the same device. Similar rules can be implemented to ensure consistency and proper configuration of the fieldbus network.

Additionally, the scheduler may also be configured to determine whether a particular device to which the block is being allocated is of the proper type such that the device supports the function block (as described herein above), and whether the particular device to which the block is being allocated has sufficient available resources such that it can properly operate according to the function block rules and/or requirement. These resources may include memory, object dictionary entries, block execution schedule entries, etc.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A logic arrangement for configuring a fieldbus network, which, when executed by a processing arrangement, is operable to perform steps comprising of:
   obtaining particular information relevant to a function block; and
   automatically generating a tag for the function block based on the particular information;
   determining whether the particular information of the function block changed; and
   if a change of the particular information is detected, generating a further tag for the function block based on a further context of the further tag.

2. The logic arrangement of claim 1, wherein the particular information includes a context of the function block.

3. The logic arrangement of claim 2, wherein the context of the function block is at least one of a global-relevant context, a device-relevant context, a control module-relevant context and a default context.

4. A method for configuring a fieldbus network, comprising the steps of:
   obtaining particular information relevant to a function block;
   automatically generating a tag for the function block based on the particular information;
   determining whether the particular information of the function block changed; and
   if a change of the particular information is detected, generating a further tag for the function block based on a further context of the further tag.

5. The method of claim 4, wherein the particular information includes a context of the function block.

6. The method of claim 5, wherein the context of the function block is at least one of a global-relevant context, a device-relevant context, a control module-relevant context and a default context.

7. A system for configuring a fieldbus network, comprising:
   a processing arrangement operable to execute the following instructions:
      obtaining particular information relevant to a function block, and
      automatically generating a tag for the function block based on the particular information:
      determining whether the particular information of the function block changed: and
      if a change of the particular information is detected, generating a further tag for the function block based on a further context of the further tag.

8. The system of claim 7, wherein the particular information includes a context of the function block.

9. The system of claim 8, wherein the context of the function block is at least one of a global-relevant context, a device-relevant context, a control module-relevant context and a default context.

* * * * *